United States Patent [19]

Cawrse et al.

[11] Patent Number: 4,525,119
[45] Date of Patent: Jun. 25, 1985

[54] APPARATUS FOR COLLECTING AND UNLOADING HAY BALES AND THE LIKE

[76] Inventors: Frank Cawrse, 35930 Providence School Rd., Lebanon, Oreg. 97355; George F. Cawrse, 38770 Hungry Hill Rd., Scio, Oreg. 97364; Frank W. Cawrse, 35930 Providence School Rd., Lebanon, Oreg. 97355

[21] Appl. No.: 580,841

[22] Filed: Feb. 16, 1984

Related U.S. Application Data

[63] Continuation of Ser. No. 65,363, Aug. 9, 1979, abandoned.

[51] Int. Cl.³ .......................... A01D 87/12; B60P 1/00
[52] U.S. Cl. ..................................... 414/111; 414/468; 474/149
[58] Field of Search .................. 414/44, 111, 468, 501, 414/502, 503, 504, 505, 519, 520, 379; 312/186, 190, 251, 252, 305; 105/265; 474/149, 240

[56] References Cited

U.S. PATENT DOCUMENTS

| | | | |
|---|---|---|---|
| 595,051 | 12/1897 | Elieson | 474/149 |
| 1,813,011 | 7/1931 | Adams | 474/149 |
| 2,436,959 | 3/1948 | Elcin et al. | 414/468 X |
| 2,482,326 | 9/1949 | Davis | 474/149 |
| 2,825,478 | 3/1958 | Hunnicutt et al. | 414/468 |
| 3,876,098 | 4/1975 | Cawrse et al. | 414/505 X |

FOREIGN PATENT DOCUMENTS

| | | | |
|---|---|---|---|
| 2327942 | 1/1975 | Fed. Rep. of Germany | 414/111 |
| 1392916 | 5/1975 | United Kingdom | 414/502 |

*Primary Examiner*—Leslie J. Paperner
*Attorney, Agent, or Firm*—Oliver D. Olson

[57] ABSTRACT

A wheeled vehicle mounts a rotary framework providing a plurality of longitudinally extending, peripheral and inner compartments for the removable storage of a multiplicity of hay bales or like objects. The framework is rotated by a driven endless chain wrapped about the framework centrally of the longitudinal ends thereof. Communication between the peripheral and inner compartments is controlled by movable gates operated selectively by spring-loaded latching mechanism at predetermined intervals of rotation of the framework. A longitudinally extending, reversibly movable feed conveyor below the framework registers with each of the peripheral compartments selectively for moving bales to and from the compartments. The arcuate shields extend from the opposite sides of the feed conveyor upwardly to form with the latter a semicircular shield surrounding the lower half of the framework to confine the bales in the lower peripheral compartments. A forwardly extending, reversibly movable delivery conveyor is aligned with the feed conveyor and is adjustable pivotally to lower its forward end for picking up bales from the ground and delivering them to the feed conveyor, and to raise its forward end for delivering bales from the feed conveyor to a storage conveyor for moving bales to storage.

6 Claims, 18 Drawing Figures

APPARATUS FOR COLLECTING AND UNLOADING HAY BALES AND THE LIKE

This application is a continuation of application Ser. No. 065,363, filed 9 Aug. 79, now abandoned.

BACKGROUND OF THE INVENTION

This invention relates to the handling of bales of hay and like objects, and more particularly to apparatus for collecting such objects from the ground for transfer to storage.

In the harvesting of hay, it is the general practice to bale it in the field and then to pick up the bales by hand or by forklift mechanisms and deposit them on the bed of a wagon or truck for transport to storage. This procedure is time consuming, laborious work requiring a considerable number of people.

Applicants' earlier U.S. Pat. No. 3,876,098 provides apparatus which overcomes the aforementioned disadvantages and limitations. However, the structure of the apparatus is rather complex and correspondingly costly; it requires considerable power to operate; and it allows a degree of twisting of the framework that results in occasional binding of movable components.

SUMMARY OF THE INVENTION

In its basic concept, the apparatus of this invention involves the driving of the rotary framework of applicants' earlier apparatus by a driven endless chain wrapped about the rotary framework intermediate the longitudinal ends thereof.

It is by virtue of the foregoing basic concept that the principal objective of this invention is achieved; namely, to overcome the aforementioned disadvantages and limitations of applicants' earlier apparatus.

A specific object of this invention is the provision of apparatus of the class described in which the power required for the rotary framework is reduced to a minimum; twisting of the rotary framework in its longitudinal direction is eliminated with resulting elimination of binding of longitudinally pivoted gates; gate control latches and other movable components; and the overall structure is of simplified design for economical manufacture and minimum maintenance.

The foregoing and other objects and advantages of this invention will appear from the following detailed description, taken in connection with the accompanying drawings of a preferred embodiment.

DESCRIPTION OF THE PREFERRED EMBODIMENT

Figure 1:
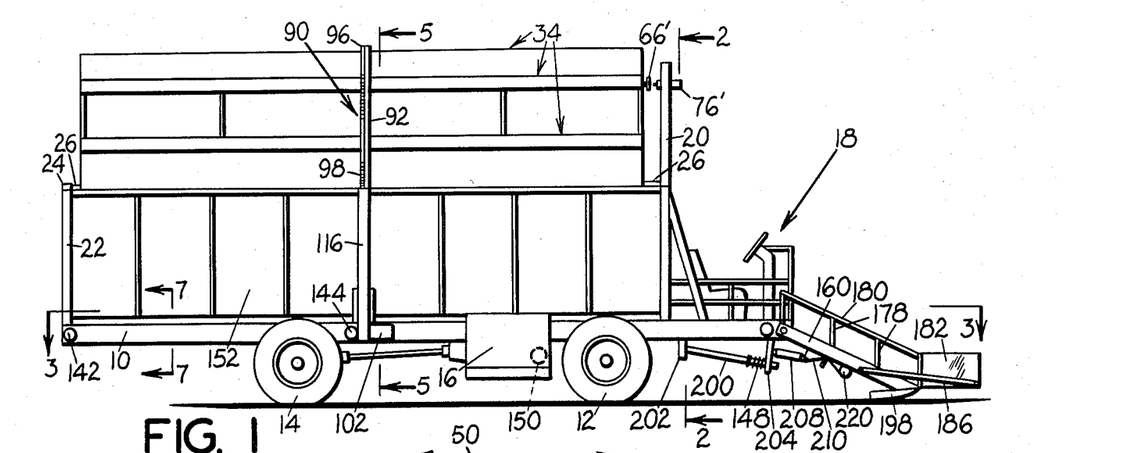
FIG. 1 is a view in side elevation of a hay bale collector and unloader embodying the features of this invention.

Referring primarily to FIG. 1 of the drawings, the apparatus of this invention is shown mounted on the frame 10 of a vehicle supported for mobility on front and rear wheels 12 and 14, respectively. Although the wheeled vehicle may be of the unpropelled wagon or trailer type adapted to be pulled by a tractor or other suitable power vehicle, the preferred type of vehicle illustrated is of the self-propelled type. Thus, it includes an engine 16 supported by the vehicle frame and controlled from an operator's station 18 at the front end of the frame. The front wheels are steerable, as will be understood.

Front and rear frame members 20 and 22, respectively extend upwardly from the vehicle frame and support at their upper ends front and rear bearings 24 which support for rotation therein the corresponding front and rear ends of an elongated shaft 26.

The elongated shaft 26 supports for rotation therewith a framework constructed to provide a plurality of elongated peripheral and inner compartments for the removable storage of a multiplicity of hay bales B or like objects. In the embodiment illustrated, the framework is constructed of a plurality of longitudinally spaced pipes 28 secured at their inner ends to the shaft 26 and extending radially outward therefrom. The framework also includes a plurality of pairs of laterally spaced, parallel, outwardly extending pipes 30 located between adjacent radial pipes 28. The radial pipes and adjacent parallel pipes are interconnected intermediate their ends by transverse reinforcing braces 32.

The outer ends of each group of pipes 28 and 30 forming a longitudinal row are interconnected by longitudinal reinforcing cap members 34. As illustrated, each cap member comprises a pair of outwardly diverging plates 36 (FIG. 5) reinforced internally at longitudinally spaced intervals by angle irons 38 and outer spacer bars 40. The forward end of each cap is closed by an arcuate, or otherwise forwardly converging or tapered plate 42. Thus, adjacent pairs of these forward end plates provide a widened entrance for facilitating the introduction of hay bales to the front end of the associated peripheral compartment, as explained more fully hereinafter.

The confronting side plates 36 of adjacent pairs of caps form with the interconnecting tranverse braces 32 an outer, longitudinally elongated compartment 44 proportioned to freely receive a plurality of longitudinally aligned bales of hay. An elongated rod 46 extends the full length of the compartment and is secured to and interconnects the associated row of longitudinally spaced transverse braces 32. The rod 36 serves with the transverse braces 32 to form the inner, bale-supporting wall of the compartment 44. The confronting plates 36 of end caps form the side walls of the compartment 44.

It is to be noted that the compartments 44 are formed between the radially extending pipes 28 and the adjacent parallel pipes 30. The space between each pair of parallel pipes 30 is arranged to provide an inner compartment 48 and an outer compartment 50. This is achieved by the provision of a pair of gates 52 and 54 which extend the full length of the framework and are mounted on pivot shafts 56 supported in bearings 58 (FIG. 5) secured to the parallel pipes 30. The outer gate 52 is arranged to swing arcuately through the outer compartment 50, while the inner gate 54 is arranged to swing through the inner compartment 48.

The inner wall of the inner compartment 48 is formed by a pair of longitudinally extending, laterally spaced rods 60 secured to the central portion of the parallel pipes 30. One side wall of each inner compartment 48 is formed by gate 54 when it is swung inward to its open position. The opposite side wall of the inner compartment is formed by an inward extension 36' (FIG. 5) of the associated cap side plate 36.

Figure 6:
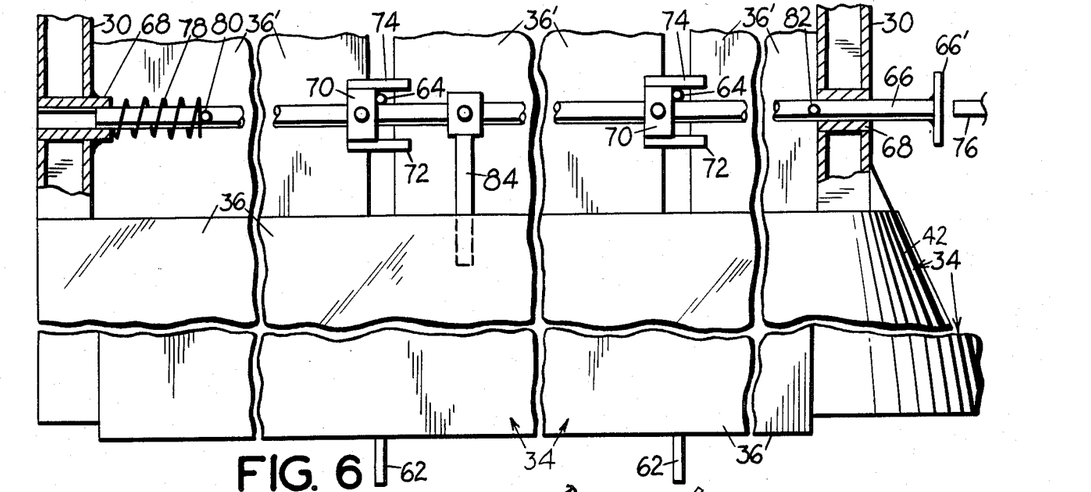
FIG. 6 is a foreshortened, fragmentary vertical section taken on the line 6—6 in FIG. 2.

Means is provided for securing the gates 52 and 54 releasably in their position traversing the space between associated parallel pipes 30. In the embodiment illustrated, a plurality of locking fingers 62 and 64 (FIG. 2) are secured at longitudinally spaced intervals along the gates 52 and 54 respectively, on the sides thereof opposite the pivot shafts 56. The fingers extend outwardly from the gates for abutment against a locking bar 66. This bar extends the full length of the framework and is slidable longitudinally in bearings 68 (FIG. 6) secured to the parallel pipes 30.

Mounted on the bar 66 adjacent the positions of the fingers 62 and 64 are associated locking lug hubs 70 each mounting a pair of locking lugs 72 and 74 for association with the fingers 62 and 64, respectively. Rearward movement of the locking bar 66, i.e. to the left in FIG. 6, removes the locking lugs from the fingers. This unlocking movement of the locking bar is effected by operation of an hydraulic ram 76 controlled by the operator of the vehicle. An enlarged head 66' on the forward end of the locking bar is provided for engagement by the ram.

Movement of the locking bar 66 in the unlocking direction is resisted resiliently by a coil spring 78 which encircles the rearward end of the bar and abuts at one end against the rear bearing 68 and at its forward end against a pin 80 projecting from the bar. The spring thus urges the locking bar resiliently to the finger locking position illustrated in FIG. 6. The limit of this movement toward the right is established by abutment of a stop pin 82 projecting from the bar against the forward bearing 68.

Rotation of the round locking bar 66 is prevented in order to insure maintenance of proper orientation of the locking lugs with respect to the locking fingers. In the embodiment illustrated, this is afforded by an arm 84 which is secured to the locking bar and projects therefrom into the elongated space between the inner, diverging ends of the cap side plates 36.

The gate locking assembly described is duplicated for each pair of gates 52 and 54 associated with the four pairs of parallel pipes 30. The hyudraulic ram 76 described is mounted on the lower portion of the left hand front frame member 20 (FIG. 2) for operating the locking mechanism associated with the gates 52 and 54 in the compartments located in the six o'clock position of rotation of the rotary framework. A second hydraulic ram 76' is located on the upper portion of the right hand front frame member 20 for operating the locking mechanism associated with the gates in the compartments located in the twelve o'clock position of rotation.

Each inner gate 54 supports an arm 86 (FIG. 5) which extends outwardly beyond the pivot shaft 56 of the gate and mounts at its outer end a resilient bumper, illustrated as a coil spring 88. The arm and bumper serve to initiate closing movement of the associated outer gate 52 when the inner gate swings to its open position, as described hereinafter.

Figures 5, 7:
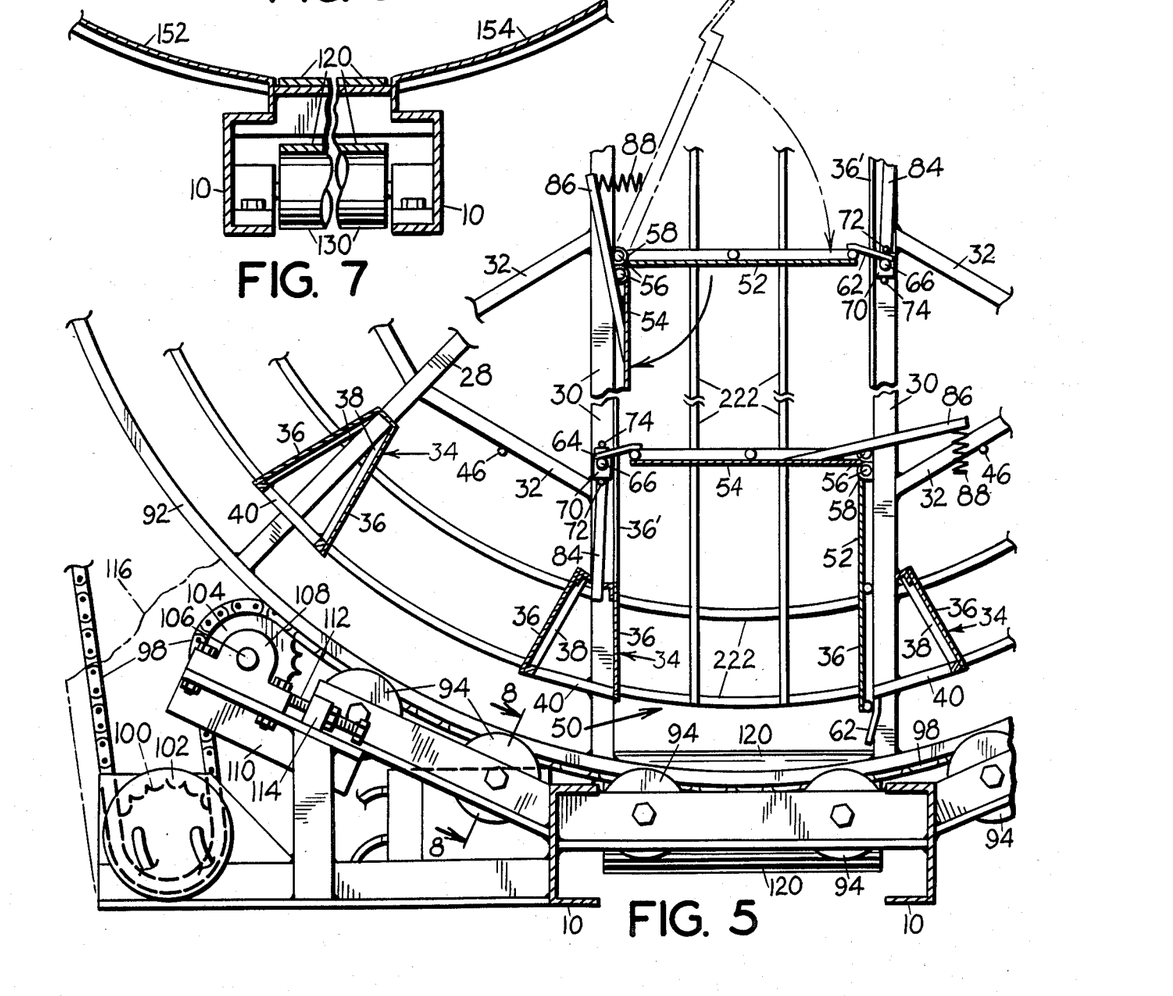
FIG. 5 is a fragmentary forshortened transverse section taken on the line 5—5 in FIG. 1.
FIG. 7 is a foreshortened, fragmentary vertical section taken on the line 7—7 in FIG. 1.

Power means is provided for rotating the rotary framework assembly. An annular ring 90 (FIG. 1) encircles the framework centrally between the longitudinal ends thereof and is secured to the outer ends of the pipes 28 and 30 which extend outwardly beyond the end caps 34. One longitudinal segment of the annular ring forms a support ring 92. It is provided with a smooth outer surface disposed in rolling contact with a plurality of support trunnions 94 mounted for rotation of the vehicle frame. As best shown in FIG. 5, the trunnions are spaced apart circumferentially on an arc having the same radius as the support ring. The ring and trunnions thus support the central portion of the rotary framework the opposite ends of which are supported by the bearings 24.

The remaining longitudinal segment 96 of the ring adjacent the support segment 92 is formed as a channel providing an outwardly facing guide groove dimensioned to freely receive and retain an endless drive chain 98. Referring again to FIG. 5 of the drawings, the drive chain extends over the upper portion of the groove, thence downward along one side and under a drive sprocket 100 secured to the rotaty output shaft of an hydraulic motor 102 mounted on the vehicle frame. The chain then extends upward over a chain tightening sprocket 104. This sprocket is mounted on a shaft 106 journaled in a bearing 108 which is secured adjustably to a secondary frame member 110 on the vehicle. Adjustment of the bearing is accomplished by means of an elongated adjustment screw 112 which extends through a threaded block 114 secured to the secondary frame and extending at its shank end into abutment with the bearing. Thus, rotation of the adjustment screw effects longitudinal movement of the bearing and consequent loosening or tightening of the chain.

From the chain tightening sprocket 104 the chain extends along the guide groove adjacent the supporting trunnions, thence upwardly along the opposite side of the ring groove to the top thereof.

The drive chain functions to grip the bottom surface of the guide groove frictionally and thus to rotate the framework assembly as the hydraulic drive motor 102 is activated.

The laterally exposed portions of the ring 90 and drive chain 92 on the side of the drive motor 102 are protected by a housing 116.

Figure 2:
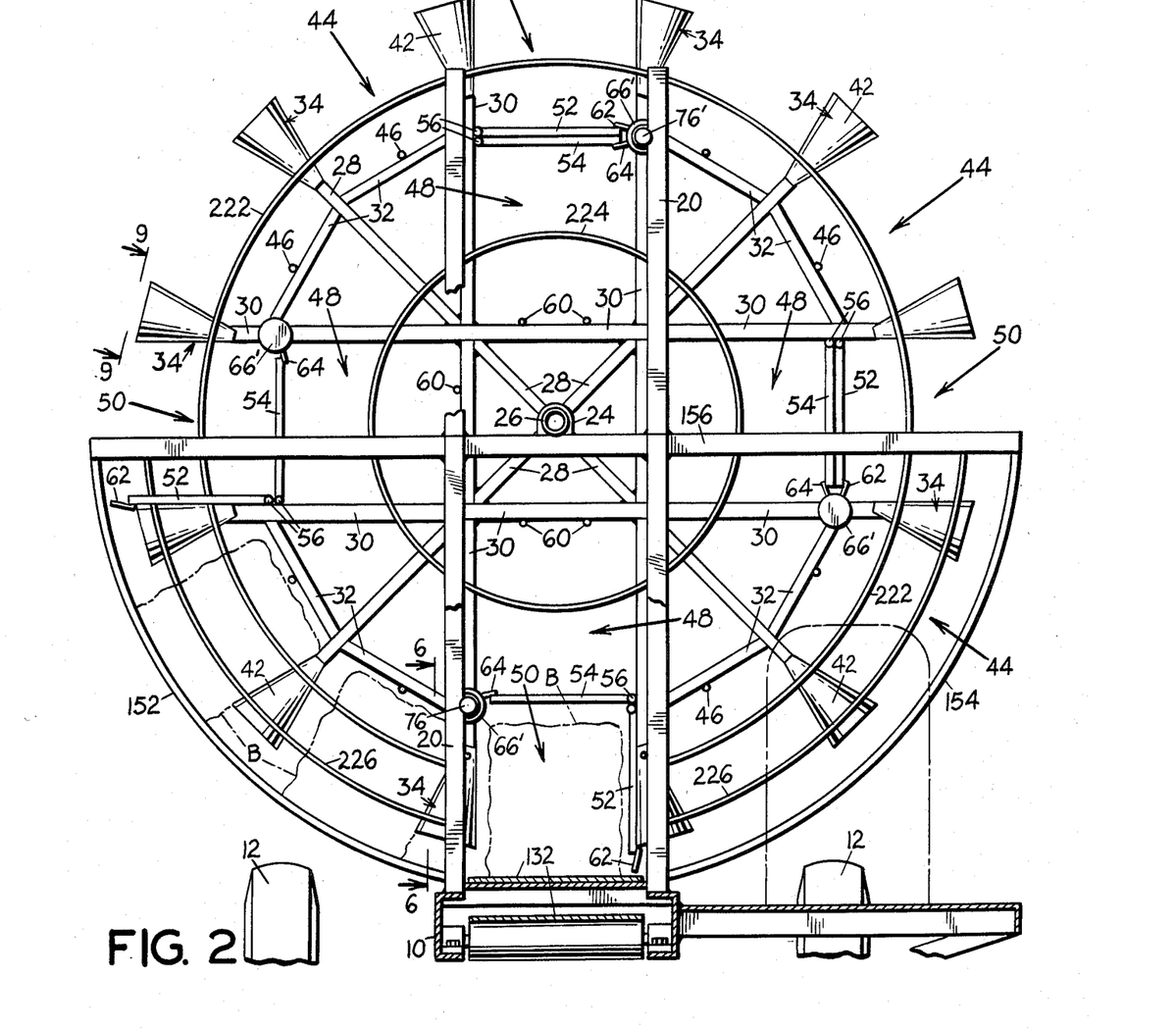
FIG. 2 is a view in transverse section taken on the line 2—2 in FIG. 1.
Figure 3:
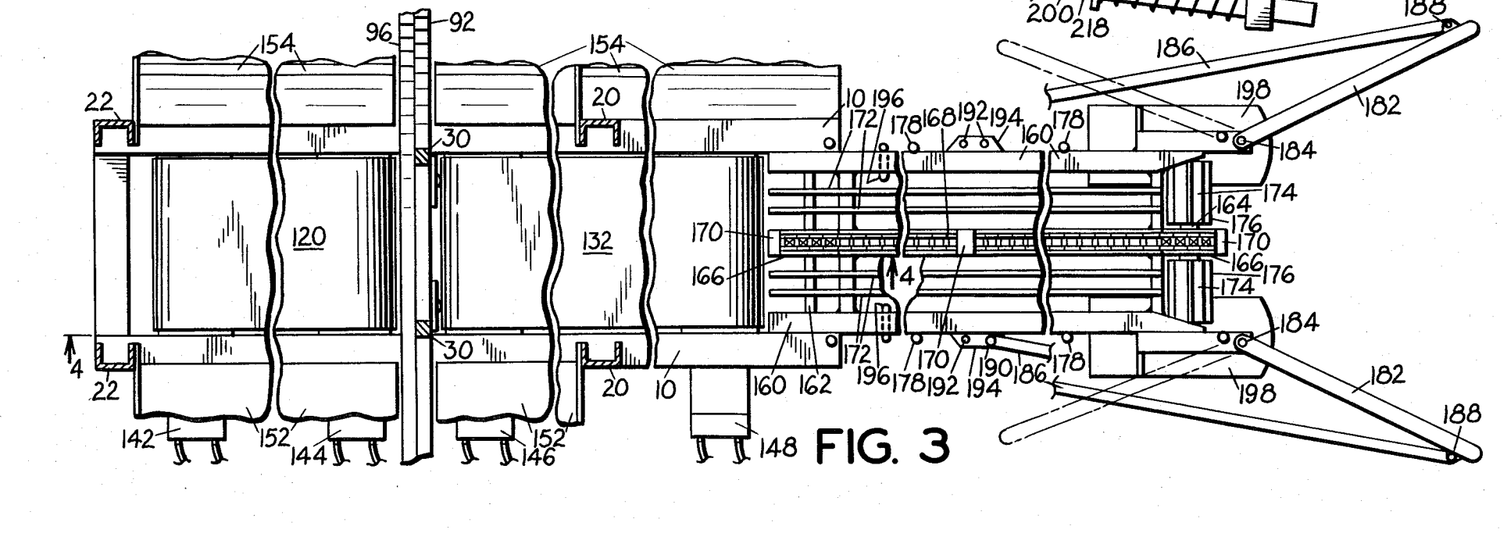
FIG. 3 is a foreshortened, fragmentary horizontal section taken on the line 3—3 in FIG. 1.
Figure 4:
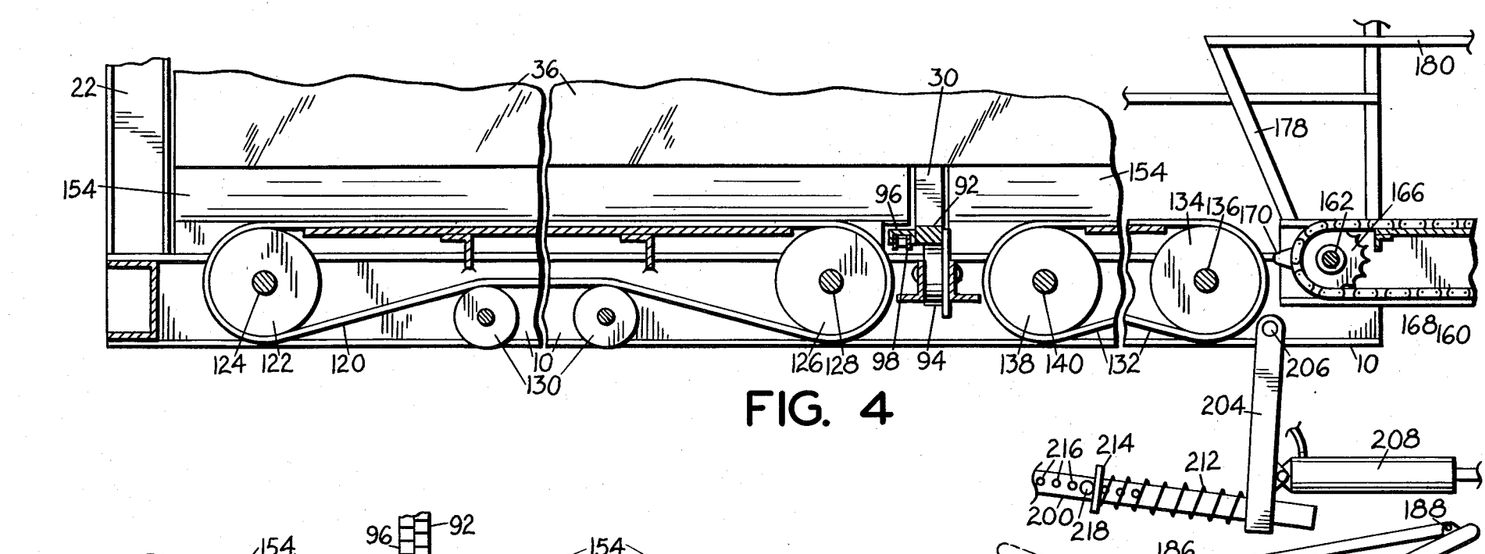
FIG. 4 is a fragmentary, foreshortened longitudinal section taken on the line 3—3 in FIG. 1.

An elongated feed conveyor is mounted on the vehicle frame 10 and extends longitudinally thereof under the rotary framework for registration with each of the peripheral compartments 44 and 50 as the latter are rotated to the downward, six o'clock position illustrated in FIG. 2. In the embodiment illustrated, the feed conveyor includes front and rear endless belt sections (FIGS. 3 and 4). The rear belt section 120 is trained about a rear roller 122 mounted for rotation with a shaft 124 journaled in bearings adjacent the rear end of the vehicle frame. The front end of the rear belt section is trained about a front roller 126 mounted for rotation with a shaft 128 journaled in bearings on the vehicle frame adjacent the rearward side of the drive chain 98. Idler rollers 130 are mounted on the vehicle frame intermediate the end rollers for supporting the bottom stretch of the rear belt section.

In similar manner, the forward endless belt section 132 is trained about a front roller 134 mounted for rotation with a shaft 136 journaled in bearings adjacent the front end of the vehicle frame, and the rearward end of the front belt section is trained about a roller 138 mounted for rotation with a shaft 140 journaled in bearings on the vehicle frame adjacent the ring-supporting trunnions 94.

The shafts 124, 128, 136 and 140 are connected to the output rotary shafts of reversible hydraulic drive motors 142, 144, 146 and 148, respectively (FIG. 3). These motors are matched and are supplied from the same source of hydraulic fluid under pressure, provided by an hydraulic pump 150 (FIG. 1) driven by the vehicle engine 16. The feed belts thus are driven simultaneously in the same direction and at the same rate of speed.

Figure 8:
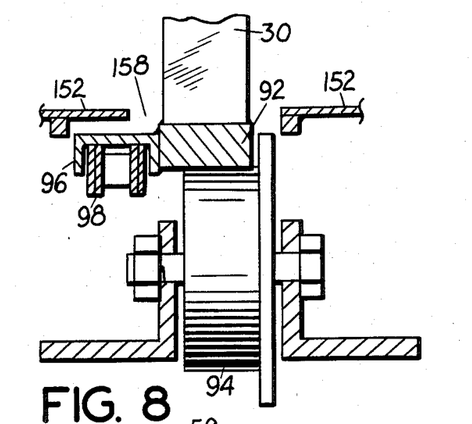
FIG. 8 is a fragmentary section taken on the line 8—8 in FIG. 5.
Figure 9:
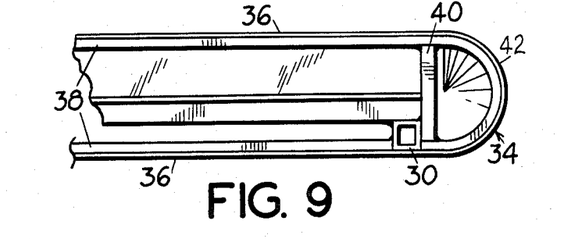
FIG. 9 is a fragmentary side view as viewed in the direction of the arrows 9—9 in FIG. 2.

Means is provided for preventing gravity removal of bales B in the peripheral compartments 44 and 50 as the latter traverse the lower half of rotation of the framework. In the embodiment illustrated, this is provided by a pair of arcuate shield plates 152 and 154 which extend arcuately upward from opposite lateral sides of the feed conveyor at least to a plane extending horizontally through the axis of the shaft 26. The shield plates are supported at their front and rear ends by transverse beams 156 secured to and extending laterally to opposite sides of the front and rear frame members 20 and 22. The shield plates also are secured along their bottom longitudinal sides to components of the vehicle frame. A central slot 158 (FIG. 8) is provided in the shield plates to accommodate the annular support ring and drive chain assembly.

A delivery conveyor also is provided for picking up hay bales and like objects from the ground and delivering them to the feed conveyor, and also for delivering hay bales and the like from the feed conveyor to a storage conveyor. The embodiment illustrated is substantially identical to the conveyor disclosed in our earlier patent identified hereinbefore. Thus, a pair of laterally spaced support arms 160 (FIG. 3) are mounted pivotally at their rearward ends on a transverse shaft 162 journaled for rotation in bearings secured to the front end of the vehicle frame. The front ends of the arms also support a transverse rotary shaft 164. Each of these shafts mounts a sprocket 166 centrally at its ends and the sprockets are interconnected by an endless conveyor chain 168. A plurality of longitudinally spaced lugs 170 are mounted on the chain for movement therewith and project outwardly therefrom for engaging hay bales and like objects for moving the latter with the chain. Skid rods 172 are mounted on opposite sides of the conveyor chain for supporting the objects being conveyed.

The shaft 164 at the front end of the support arms also mounts a pair of laterally spaced pickup rotors 174 each provided with a plurality of radial paddles 176 to assist in picking up hay bales and like objects from the ground, as explained more fully hereinafter.

Longitudinally spaced upstanding brackets 178 (FIG. 1) on support arms 160 mount a pair of laterally spaced guide rails 180 which extend substantially parallel to the support arms above the latter and serve to confine hay bales and like objects therebetween. Forwardly of the guide rails are a pair of laterally spaced guide plates 182 (FIG. 2) which serve to guide hay bales and like objects into the space between them and thence onto the delivery conveyor. These guide plates are supported at their rear ends on upright pivot shaft 184 secured to forward, outwardly offset extensions of the support arms 160. An elongated adjustment rod 186 is connected at one end by a pivot pin 188 to each guide plate 182 and provided at its opposite end with a pin 190 for selective reception in any one of a pair or more of anchor holes 192 in a bracket 194 secured to the support arm 160. The angle of divergence of the guide plate thus is rendered adjustable. By disengaging the pin 190 from the anchor hole, the rod 186 may be pulled rearward to swing the guide plate toward the rear of the delivery conveyor. Hangers 196 depending from the arms 160 serve to support the free ends of the rods 186.

Downwardly extending brackets on the support arms extensions support a pair of laterally spaced skid shoes 198 which are adapted to engage and slide along the ground and thus position the front end of the delivery conveyor in close proximity to the ground for picking up objects therefrom.

A major portion of the weight of the delivery conveyor is counter-balanced resiliently for minimizing the ground contact pressure of the skid shoes. The latter thus react quickly to variations in ground contour as the vehicle is propelled during the collection operation. This resilient support is provided by a rod 200 secured pivotally at its rearward end to a vehicle frame bracket 202 (FIG. 1), as by a pivot pin. The opposite end of the rod extends slidably through an opening in a hinge plate 204 secured pivotally to the vehicle frame by a pivot shaft 206 (FIG. 4). A link member 208 pivotally interconnects the hinge plate and a bracket 210 projecting downward from the support arms 160 of the delivery conveyor. A coil spring 212 encircles the rod and abuts at one end against the hinge plate 204 and at the opposite end against a collar 214 mounted slidably on the rod. A plurality of longitudinally spaced, transverse openings 216 in the rod removably receive an abutment pin 218 for the collar. Accordingly, the collar may be adjusted along the length of the rod and secured in adjusted position by the abutment, to vary the compression of the coil spring and hence the resilient counter-balancing support of the delivery conveyor.

The link member 208 is provided in the form of an extensible and retractable fluid pressure piston-cylinder unit. By application of fluid under pressure to effect extension of the unit from the retracted position illustrated in FIG. 1, the delivery conveyor is pivoted upward about the axis of the shaft 162 to any desired degree of inclination, such as is exemplified in FIG. 4. In this position the delivery conveyor may be aligned with a storage conveyor leading from a barn or other storage facility, to transfer hay bales or like objects from the collection framework to the storage facility.

In the preferred embodiment illustrated, the delivery conveyor chain 166 is driven by means of an hydraulic motor 220 (FIG. 1) connected to the chain through a sprocket and supplied with hydraulic fluid under pressure from the engine-driven pump.

The operation of the apparatus deacribed hereinbefore is as follows: Let it be assumed that the collection compartments of the framework are empty and it is desired to collect hay bales B from the field for transport to storage. Let it also be assumed that the gates 52 and 54 are locked in closed position, by the locking lugs 72 and 74.

The guide plates 182 are secured in the desired forwardly diverging position, by inserting the pin 190 at the rearward end of each of the adjustment rods 186 in the desired one of the openings 192 in the associated anchor bracket. The operator now lowers the front end of the delivery conveyor to bring the skid shoes 198 into resilient contact with the ground. The operator also adjusts a control valve (not shown) to deliver hydraulic fluid under pressure to the drive motors to effect movement of the upper working stretches of the delivery conveyor chain 168 and feed conveyor belts 120 and 132 toward the rear of the vehicle.

Figure 10:
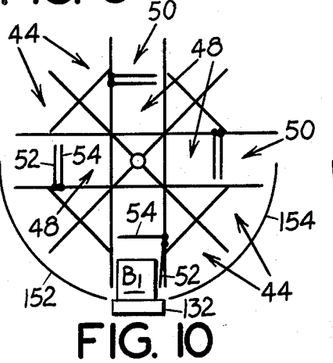
FIGS. 10-17 are schematic front elevational views illustrating the sequence of operations in loading bales into the apparatus.
Figure 11:
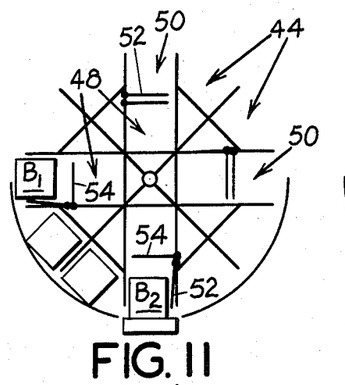

The operator also activates the framework drive motor 102 to rotate the drive chain 98 and hence the framework until one of the peripheral compartments, preferably the outer compartment 50 of a dual compartment, is aligned with the feed conveyor. The ram 76 is activated to unlock the gate 52 in the compartment 50 at the six o'clock position, i.e. the compartment registering with the feed conveyor, to allow the gate to open by gravity to the position shown in FIG. 10. The operator then moves the vehicle through the field to pick up hay bales onto the delivery conveyor from whence they are delivered rearwardly to the feed conveyor. The bales are moved sequentially toward the rear of the compartment where the rearwardmost bale abuts the circular and diammetrical stop rods 222 (FIGS. 2 and 5) which traverse the rearward ends of the compartments. The feed conveyor continues to rotate, sliding under the stopped bales supported thereon.

Front circular stop rods 224 and 226 also are provided, being secured to the frame members 20 and 156, to prevent forward movement of bales. The inner rod 224 extends across the front end of the inner compartments 48. The outer rod 226 extends across all of the outer compartments except the one that registers with the feed conveyor.

When the first compartment has been filled with bales $B_1$ (FIG. 10), the operator again energizes the framework drive motor to rotate the framework until the next adjacent peripheral compartment 44 registers with the feed conveyor. During this rotation the bales $B_1$ collected in the first compartment are moved arcuately off of the feed conveyor and onto the inner surface of the arcuate shield 152. The latter serves to retain the bales in the compartment.

The foregoing sequence is repeated until the first six peripheral compartments are filled with bales. It will be understood of course, that as each of the dual compartments are brought to the six o'clock position registering with the feed conveyor, the outer gate 52 is unlocked to swing arcuately downward, counterclockwise, to the open position, in preparation for receiving a plurality of bales in the outer compartment.

Figure 12:
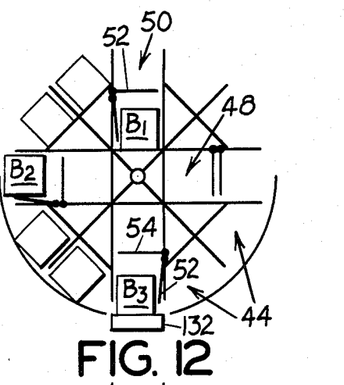
Figure 13:
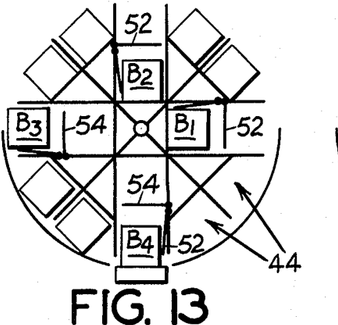

With the peripheral compartment containing the first group of bales $B_1$ now having reached the twelve o'clock position of rotation (FIG. 12), the unlocking cylinder 76' is extended to release the underlying gate 54, by retraction of the locking lugs 74 from the locking fingers 64. The gate 54 thus swings arcuately downward by gravity, dropping the row of bales $B_1$ into the inner compartment 48.

As the released gate 54 approaches its fully open position, the bumper spring 88 projecting from the end of the support arm 86 attached to the gate, abuts the upwardly projecting open gate 52 which had been positioned adjacent the row of bales $B_1$ in the outer compartment 50. This abutment of the bumper spring initiated movement of the open gate 52 arcuately clockwise to the closed position illustrated in FIGS. 12 and 5.

The operator then actuates the cylinder 76' to retract its piston rod and thus allow the locking bar to move, under the influence of the coil spring 78, to the locking position in which the outer gate 52 associated with the bales $B_1$, is locked.

Figure 14:
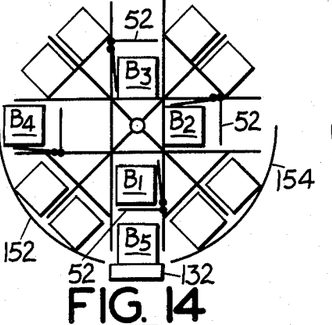
Figure 15:
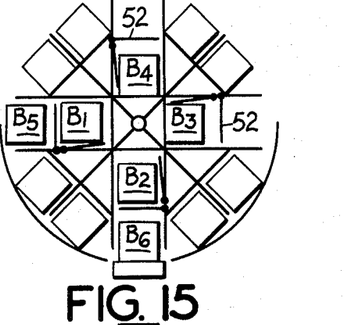
Figure 16:
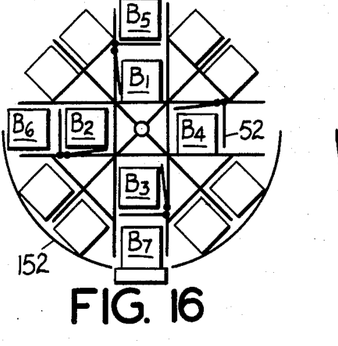

The foregoing sequence of operations is repeated until the groups of bales $B_2$, $B_3$ and $B_4$ are transferred from the outer compartments 50 to the associated inner compartments 48. FIG. 14 illustrates the condition when the framework has rotated 360° from the start position of FIG. 10. The dual compartment in which the first group of bales $B_1$ were inserted and subsequently transferred to the inner compartment thereof, now is once again in registry with the feed conveyor. The associated outer compartment 50 then is filled with bales $B_5$, as indicated. The framework then is rotated sequentially through additional 90° intervals (FIGS. 15, 16 and 17) to complete the filling of the outer peripheral compartments of the corresponding dual compartments with bales $B_6$, $B_7$, and $B_8$. With the framework thus fully loaded, the vehicle then may be driven to the storage facility for transfer of the bales to storage.

To illustrate the capacity of the apparatus, the longitudinal length of the framework typically is about twenty feet. Accordingly, each compartment may contain from five to seven bales, depending upon their size. Thus, assuming six bales may be contained in each compartment, the total of sixteen compartments in the embodiment illustrated serves to collect a total of ninety-six bales.

At the storage site, the operator directs hydraulic fluid under pressure to the cylinder of the piston-cylinder unit 208 to elevate the delivery conveyor arcuately upward for alignment with the infeed end of a storage conveyor (not shown) which extends into the storage facility. If desired, the guide plates 182 may be swung rearward to a more convenient, out-of-the way position, by removing the pins 190 of the support rods 186 from the apertured bracket 194, swinging the arms arcuately rearward and storing the free end of the rods on the hangers 196.

Figure 17:
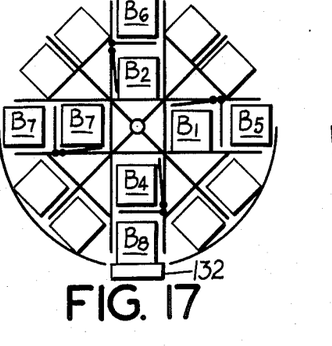

With the collection framework in the position illustrated in FIG. 17, the operator then reverses the drive of the feed conveyor and delivery conveyor to effect movement of the upper working stretches in the forward direction. The group of bales $B_8$ contained in the peripheral compartment registering with the feed conveyor thus is moved out of the compartment, along the delivery conveyor and thence to the storage conveyor for entrance into the storage facility.

Having thus removed the group of bales $B_8$ from the outer compartment, the operator activates the hydraulic cylinder 76 to unlock the associated outer gate 52, whereupon the latter swings arcuately downward, releasing the group of bales $B_4$ to drop from the inner compartment onto the feed conveyor (FIGS. 18) for removal to storage.

Figure 18:
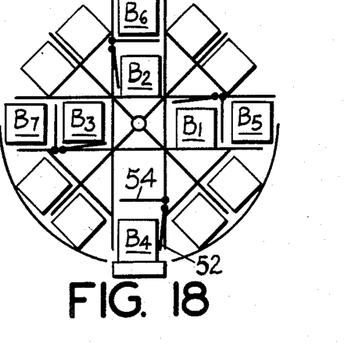
FIG. 18 is a schematic front elevational view illustrating the first stage of unloading bales from the apparatus.

Upon removal of the bales $B_4$ from the inner compartment, the associated inner gate 54 swings downward from its open position of FIG. 17 to its closed position of FIG. 18. The locking cylinder 76 then is activated to retract its piston rod to effect movement of the locking bar 66 to its locking position. The gate 54 thus is locked in its closed position.

The operator then indexes the framework to bring the next adjacent peripheral compartment 44 into registry with the feed conveyor, for removal of the group of bales contained therein. This sequence is repeated until all of the compartments have been emptied of their contents of bales. The framework thus is returned to the condition of FIG. 10, in readiness to repeat the collecting cycle.

Although the provision of the reversible delivery conveyor is preferred, it will be apparent that outfeed of bales from the framework compartments may be effected from the rear end of the vehicle, by reversal of the front and rear stop rods 224, 226 and 222, respectively, and alignment of the rear end of the feed conveyor with a storage conveyor. In this event the feed and delivery conveyors need not be reversible, and the piston-cylinder unit 208 need function merely to elevate the forward end of the delivery conveyor above the ground to facilitate transport of the vehicle between the field and storage facility.

From the foregoing it will be appreciated that the apparatus of this invention contributes significantly to simplification and yet improvement of operation of the apparatus of our earlier patent identified hereinbefore. With the centrally located chain drive, the rotary framework requires minimum power for operation, and the assembly requires minimum maintenance, while substantially eliminating longitudinal twisting of the framework. By hinging the gates 52 and 54 of each pair to the same side of the associated compartments 48, 50 and providing a single longitudinally movable locking bar 66 for both gates, the number of components of the locking mechanism is substantially reduced.

It will be apparent to those skilled in the art that various changes may be made in the size, shape, type, number and arrangement of parts described hereinbefore without departing from the spirit of this invention.

Having now described our invention and the manner in which it may be used, we claim:

1. In apparatus for collecting and unloading hay bales and like objects, and comprising:
   (a) a mobile vehicle frame,
   (b) an elongated framework mounted longitudinally on the vehicle frame for rotation on a horizontal axis,
   (c) the framework defining a plurality of longitudinally extending, circumferentially spaced peripheral compartments,
   (d) feed conveyor means on the vehicle frame extending longitudinally of and below the rotary framework for registration with each peripheral compartment selectively upon rotation of the framework,
   (e) feed conveyor drive means interengaging the vehicle frame and feed conveyor means for moving the later,
   (f) shield means mounted on the vehicle frame and extending arcuately upward from opposite sides of the feed conveyor means for enclosing the lower half of the framework for preventing gravity removal of hay bales and the like as the compartments traverse the lower half of rotation of the framework, and
   (g) framework drive means interengaging the vehicle frame and framework for rotating the latter stepwise to register each peripheral compartment selectively with the feed conveyor means, the drive means comprising:
   (1) an annular ring secured to and encircling the framework centrally of the longitudinal ends thereof and including an outwardly facing annular guide groove having a substantially smooth surface,
   (2) an endless flexible drive chain received freely in the guide groove in frictional engagement with the surface thereof,
   (3) tightener means on the frame engaging the flexible drive chain for tightening the latter into frictional driving engagement with the surface of the guide groove, and
   (4) rotary drive means mounted on the vehicle frame outwardly of the shield means and engaging the drive chain for driving the chain and rotating the framework,
   (h) the shield means having an opening therethrough for passage of the drive chain between the annular ring and rotary drive means.

2. The apparatus of claim 1 wherein the annular ring comprises a first longitudinal section having a smooth outer surface arranged for rolling engagement with trunnions mounted on the vehicle frame, and an integral second longitudinal section forming an outwardly facing annular groove freely receiving the drive chain therein.

3. In apparatus for collecting and unloading hay bales and like objects and comprising:
   (a) a mobile vehicle frame,
   (b) an elongated framework mounted longitudinally on the vehicle frame for rotation on a horizontal axis,
   (c) the framework defining a plurality of longitudinally extending, circumferentially spaced peripheral compartments and a plurality of longitudinally extending, circumferentially spaced inner compartments each registering with a peripheral compartment,
   (d) feed conveyor means on the vehicle frame extending longitudinally of and below the rotary framework for registration with each peripheral compartment selectively upon rotation of the framework,
   (e) feed conveyor drive means interengaging the vehicle frame and feed conveyor for moving the latter, and
   (f) framework drive means interengaging the vehicle frame and framework for rotating the latter stepwise to register each peripheral compartment selectively with the feed conveyor means,
   (g) gate means on the framework associated with each inner compartment and movable between an extended position operatively closing the inner compartment from the associated peripheral compartment, for retaining objects removably in the inner compartment, and a retracted position opening said inner compartment to the associated peripheral compartment, for passage of objects between said compartments, the gate means comprising
   (1) an inner gate mounted pivotally on the framework adjacent one side of the inner compartment,
   (2) an outer gate mounted pivotally on the framework adjacent the inner gate and on the same compartment side, and
   (3) locking means on the framework adjacent the side of the compartment opposite the pivot mountings for the gates and operable to secure the gates releasably in closed position extending across and separating the inner and outer compartments.

4. The apparatus of claim 3 wherein the locking means comprises an elongated locking bar mounted on the framework for longitudinal movement, a locking finger on each gate extending outwardly for engagement with the locking bar, and a locking lug on the locking bar movable therewith into and out of engagement with the locking fingers.

5. The apparatus of claim 4 including extensible operator means mounted on the vehicle frame in the twelve o'clock and six o'clock positions of rotary adjustment of the inner compartments and arranged to engage the associated locking bar for moving the latter to gate-unlocking position.

6. The apparatus of claim 5 including resilient retracting means interengaging the locking bar and framework for urging the locking bar resiliently toward locking position.

* * * * *